United States Patent
Park et al.

(10) Patent No.: US 8,713,596 B2
(45) Date of Patent: Apr. 29, 2014

(54) METHOD AND SYSTEM FOR BLOCKING HAZARDOUS INFORMATION

(75) Inventors: Sun Woo Park, Pyeongtaek-Si (KR);
Young Hun Kim, Pyeongtaek-Si (KR);
In-Won Kang, Pyeongtaek-Si (KR);
Taeyong Park, Pyeongtaek-Si (KR);
Sungtack Byun, Pyeongtaek-Si (KR)

(73) Assignee: LG Electronics Inc., Seoul (KR)

( * ) Notice: Subject to any disclaimer, the term of this patent is extended or adjusted under 35 U.S.C. 154(b) by 1059 days.

(21) Appl. No.: 11/948,590

(22) Filed: Nov. 30, 2007

(65) Prior Publication Data

US 2009/0089829 A1    Apr. 2, 2009

(30) Foreign Application Priority Data

Jul. 3, 2007  (KR) .................. 10-2007-0066324

(51) Int. Cl.
*H04N 7/16*        (2011.01)

(52) U.S. Cl.
USPC ............. 725/28; 725/26; 725/109; 725/110; 726/23; 726/24; 709/203; 709/228; 709/229

(58) Field of Classification Search
USPC ............... 725/28, 25, 27, 62, 109, 110, 114; 726/23, 24, 25; 709/203, 228, 229
See application file for complete search history.

(56) References Cited

U.S. PATENT DOCUMENTS

| | | | | |
|---|---|---|---|---|
| 5,678,041 | A * | 10/1997 | Baker et al. ........................... | 1/1 |
| 6,493,744 | B1 * | 12/2002 | Emens et al. ................. | 709/203 |
| 7,231,392 | B2 * | 6/2007 | Ro ........................... | 707/999.01 |
| 7,818,764 | B2 * | 10/2010 | Matz ............................... | 725/34 |
| 2003/0002709 | A1 * | 1/2003 | Wu ............................... | 382/100 |
| 2006/0107323 | A1 * | 5/2006 | McLean ......................... | 726/23 |
| 2006/0130118 | A1 * | 6/2006 | Damm ........................ | 725/135 |
| 2008/0155693 | A1 * | 6/2008 | Mikan et al. .................... | 726/23 |
| 2012/0079525 | A1 * | 3/2012 | Ellis et al. ....................... | 725/28 |

FOREIGN PATENT DOCUMENTS

KR    10-2002-0027987 A    4/2002

* cited by examiner

*Primary Examiner* — Brian T Pendleton
*Assistant Examiner* — Alan Luong
(74) *Attorney, Agent, or Firm* — Birch, Stewart, Kolasch & Birch, LLP

(57) ABSTRACT

A method for blocking objectionable information on a terminal. The method includes receiving header information corresponding to a particular multimedia content, extracting grade information from the header, determining if the extracted grade information is an allowable grade indicating that the particular multimedia content can be received by the terminal, receiving the particular multimedia content if the determining step determines the extracted grade information is the allowable grade, comparing the received multimedia content with objectionable information determination data stored in the terminal to determine if the multimedia content is objectionable, and assigning an objectionable grade to the header of the multimedia content when the comparing step determines the received multimedia content is objectionable.

25 Claims, 3 Drawing Sheets

ND SYSTEM FOR BLOCKING
METHOD AND SYSTEM FOR BLOCKING HAZARDOUS INFORMATION

CROSS-REFERENCE TO A RELATED APPLICATION

The present application claims priority under 35 U.S.C. 119 and 35 U.S.C. 365 to Korean Patent Application No. 10-2007-0066324 filed on Jul. 3, 2007, which is hereby incorporated by reference in its entirety.

BACKGROUND OF THE INVENTION

1. Field of the Invention

The present invention relates to a method and a system for blocking objectionable messages and data.

2. Description of the Related Art

Mobile terminals now include a variety of additional functions besides the basic call function. For example, users can access the Internet, transfer and receive multimedia files, play videos and music, send and receive text and voice messages, perform scheduling tasks, etc. using their mobile communication terminal.

In addition, the amount of menu options on the mobile terminal has also increased to allow the user to perform the variety of different functions on the mobile terminal. For example, the user can select a main menu option and then select an Internet menu option to access the Internet and view or download multimedia contents. For example, the user can download music files by accessing the Internet and searching for a particular Internet option.

Mobile communication terminal also include high quality digital cameras that the user can use to take still or moving pictures. The user can also transfer any captured images to another mobile terminal. Thus, users can share photographs or short movies they have taken using their mobile terminal. The user created content is stored on a user's home page or another Internet site such as YOUTUBE. The user created content is often referred to as UCC (user created contents) or UGC (user generated contents).

Further, other users can access and view the UCC or UGC via the Internet. In addition, the users can transmit messages and other multimedia data to other users. Sometimes the data transmitted may be objectionable to a particular user.

SUMMARY OF THE INVENTION

Accordingly, one object of the present invention is to address the above-noted and other problems.

Another object of the present invention is to provide a mobile terminal in which an objectionable class of multimedia content determined as objectionable is adjustable.

Another object of the present invention is to provide a terminal that blocks objectionable content sent to the mobile terminal.

To achieve these and other advantages and in accordance with the purpose of the present invention, as embodied and broadly described herein, the present invention provides in one aspect a method for blocking objectionable information on a terminal. The method includes receiving header information corresponding to a particular multimedia content, extracting grade information from the header, determining if the extracted grade information is an allowable grade indicating that the particular multimedia content can be received by the terminal, receiving the particular multimedia content if the determining step determines the extracted grade information is the allowable grade, comparing the received multimedia content with objectionable information determination data stored in the terminal to determine if the multimedia content is objectionable, and assigning an objectionable grade to the header of the multimedia content when the comparing step determines the received multimedia content is objectionable.

In another aspect, the present invention provides a system for blocking objectionable information on a terminal. The method includes a server configured to store multimedia content, and at least one mobile terminal configured to received header information corresponding to a particular multimedia content, to extract grade information from the header, to determine if the extracted grade information is an allowable grade indicating that the particular multimedia content can be received by the terminal, to receive the particular multimedia content if the extracted grade information is determined to be the allowable grade, to compare the received multimedia content with objectionable information determination data stored in the terminal to determine if the multimedia content is objectionable, and to assign an objectionable grade to the header of the multimedia content when the comparing step determines the received multimedia content is objectionable.

In still another aspect, the present invention provides a mobile communication terminal including a receiving unit configured to receive header information corresponding to a particular multimedia content, an extracting unit configured to extract grade information from the header, a determining unit configured to determine if the extracted grade information is an allowable grade indicating that the particular multimedia content can be received by the terminal, in which the receiving unit further configured to receive the particular multimedia content if the determining step determines the extracted grade information is the allowable grade, a comparing unit configured to compare the received multimedia content with objectionable information determination data stored in the terminal to determine if the multimedia content is objectionable, and an assigning unit configured to assign an objectionable grade to the header of the multimedia content when the comparing step determines the received multimedia content is objectionable.

Further scope of applicability of the present invention will become apparent from the detailed description given hereinafter. However, it should be understood that the detailed description and specific examples, while indicating preferred embodiments of the invention, are those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Hereinafter, preferred embodiments will be described with reference to the accompanying drawings.

Figure 1:
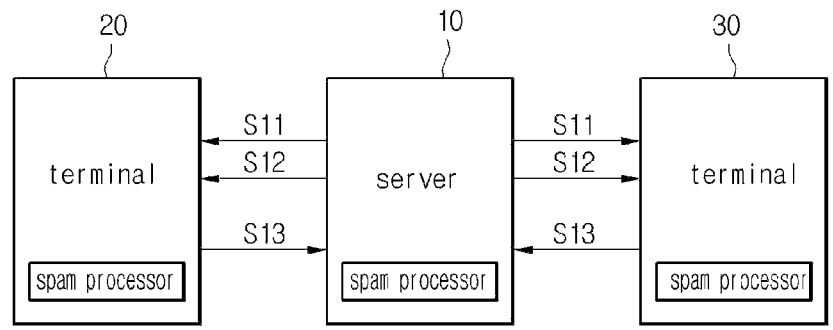
FIG. 1 is a block diagram illustrating a system for blocking objectionable information according to an embodiment of the present invention.

FIG. 1 is a block diagram illustrating a system for blocking objectionable information according to an embodiment of the present invention. As shown, the system includes a multimedia content server 10 and terminals 20 and 30, each of which has a Spam processor, respectively. This embodiment will be described referring to communications between the multimedia content server 10 and the terminal 20.

Various multimedia content are registered in or deleted from the server 10. Further, the server 10 assigns an objectionable class to the multimedia content using the Spam processor when the multimedia content is determined as objectionable information. For example, when the multimedia content is an MPEG file, the server 10 records an objectionable class in a reserved bit of the header of the MPEG file. The objectionable information refers to multimedia content such as lewd moving pictures and advertisement moving pictures.

In addition, the terminal 20 accesses the server 10 and downloads desired multimedia content. The downloaded multimedia content is then analyzed to see if it categorized as objectionable information. In more detail, the server 10 first only transmits the header of the multimedia content selected by the terminal 20, and the terminal 20 determines it the header includes an objectionable class. The terminal 20 then displays a message about the objectionable class such that a user can determine if the multimedia content is objectionable content.

Also, if the objectionable class is not recorded in the received header, the terminal 20 downloads the multimedia content and then determines if the multimedia content is objectionable information using the Spam processor. If the multimedia content is objectionable information, the terminal 20 records an objectionable class in the header and transmits the header to the server 10. The server 10 then records the received objectionable class in the header transmitted by the terminal 20, and updates the objectionable class.

In addition, if the server transmits a header indicating an objectionable class that is different than an objectionable class set by the terminal 20, the terminal 20 transmits a header to the server 10 including a new updated objectionable class (that corresponds to the objectionable class set on the terminal 20). Accordingly, the objectionable class of the multimedia content registered in the server 10 can be adjusted.

In addition, the server 10 can determine objectionable class updates sent by the terminal 20 based on priorities. For example, if the objectionable class received from the terminal 20 has a priority lower than that of a objectionable class previously assigned, the server 10 does not update the objectionable class. However, if the objectionable class received from the terminal 20 has a priority higher than that of the objectionable class previously assigned, the server 10 updates the objectionable class.

Thus, as shown by the arrows in FIG. 1, the server 10 provides the terminal 20 with objectionable information determination data, which is used for determining if the multimedia content is objectionable information, and a software program used for determining if the multimedia content is objectionable information (S11). If the terminal 20 already includes the appropriate software program for determining if the multimedia content is objectionable, the server 10 does not need to retransmit the software program.

Further, the server 10 can transmit the objectionable information determination data to the terminal 20 whenever the objectionable information determination data is updated through a pattern learning process and the like, and can also determine objectionable information using the hardware of the terminal 20.

In FIG. 1, the server 10 transmits the multimedia content requested by the terminal 20 (S12) such that the terminal 20 can decide if the multimedia contents includes objectionable information. If an objectionable class has been assigned to a header in the multimedia content, the terminal 20 displays a message such that a user can recognize the objectionable class. However, if the objectionable class has not been assigned to the received multimedia content, the terminal 20 determines if the received multimedia content is objectionable information, and transmits relevant information to the server 10 (S13).

The server 10 then updates the objectionable class for the particular multimedia content.

In addition, rather than transmitting all of the multimedia content, the server 10 can first transmit only the header of the multimedia content (this reduces the traffic load). The terminal 20 then checks an objectionable class in the received header, and displays a message to the user about the objectionable class. For example, the terminal 20 can display a message such as "This content is lewd content" or "This content is advertisement content" according to the objectionable class.

Further, the server 10 compiles and stores lists of terminals accessing the server 10 and multimedia content downloaded by the terminals into a database. Then, when the objectionable class of the multimedia content registered in the server 10 is updated, the server 10 transmits a header having the updated objectionable class to a terminal that previously downloaded the updated multimedia content when the terminal again accesses the server 10, so that the objectionable class of the multimedia content stored in the terminal can be updated.

In addition, as shown in FIG. 1, the terminals 20 and 30 operate as a transmission-side terminal and a reception-side terminal based on the direction of transmission between the terminals, thereby being able to transmit or receive multimedia content. The following description assumes the terminal 20 is a transmission-side terminal 20 and the terminal 30 is a reception-side terminal 30.

That is, the reception-side terminal 30 receives multimedia content from the transmission-side terminal 20, determines if the multimedia content is objectionable information, and transmits the determined objectionable class of the multimedia content to the transmission-side terminal 20. The transmission-side terminal 20 records and updates the received objectionable class in the multimedia content. For example, when an objectionable class has been previously assigned, the transmission-side terminal 20 determines the update of the objectionable class according to the priorities of the objectionable class, and adjusts the objectionable class.

Thus, according to embodiments of the present invention, when multimedia content is transmitted/received between terminals, the reception-side terminal determines the objectionable class and transmits the determined objectionable class to the transmission-side terminal, so that the objectionable class of the multimedia content can be adjusted between the terminals, and the terminals can selectively receive and filter multimedia content based on the objectionable class.

Therefore, because a large amount of multimedia content is registered in the server 10, the terminal 20 can determine objectionable information and transmit relevant information to the server 10 even if the server 10 did not determine the multimedia is objectionable information. Thus, the objectionable class can be assigned by the terminal 20 to multimedia content that was not assigned an objectionable class by the server 10, and the objectionable class of objectionable multimedia content can be adjusted. Further, the terminal can selectively receive and filter multimedia content based on the objectionable class.

In addition, when multimedia content is transmitted/received between the terminals 20 and 30, the objectionable information can be determined and the objectionable class of the multimedia content can be recorded and adjusted. If the objectionable class of the multimedia content registered in the server 10 is updated, information including the updated objectionable class is transmitted when a terminal having previously downloaded the multimedia content again accesses the server 10. Accordingly, the objectionable class of the multimedia content can be adjusted between the server 10 and the terminals 20 or 30.

Figure 2:
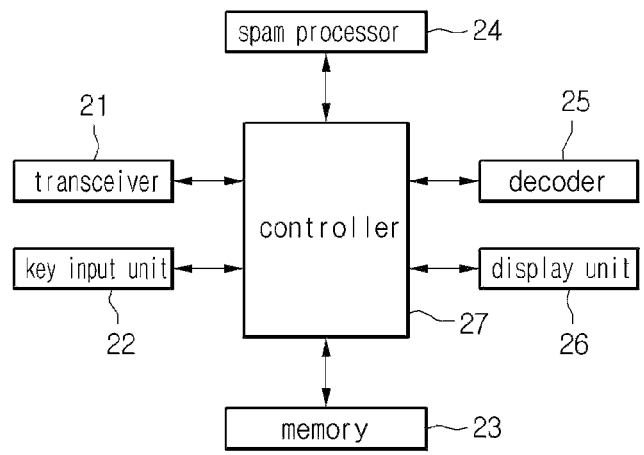
FIG. 2 is a block diagram illustrating a terminal according to an embodiment of the present invention.

Next, FIG. 2 is a block diagram illustrating a terminal according to an embodiment of the present invention. As shown, the terminal includes a transceiver 21, a key input unit 22, a memory 23, a Spam processor 24, a decoder 25 and a controller 27. The transceiver 21 receives objectionable information determination data and multimedia content and transmits an objectionable class, which is determined from the received multimedia content, to the server.

The key input unit 22 selects multimedia content to be received from the server, and the memory 23 stores the objectionable information determination data and the multimedia content. The Spam processor 24 determines if the multimedia content is objectionable information using the objectionable information determination data, and decides an objectionable class. Further, the decoder 25 extracts image data from the multimedia content, and the controller 27 records the objectionable class in the header of the multimedia content and controls an objectionable class indication message to be displayed on the display unit 26.

Further, this embodiment refers to the mobile terminal being a mobile communication terminal capable of creating, storing and outputting multimedia content, accessing the server, registering and deleting the multimedia content and downloading various multimedia content registered in the server.

Figure 3:
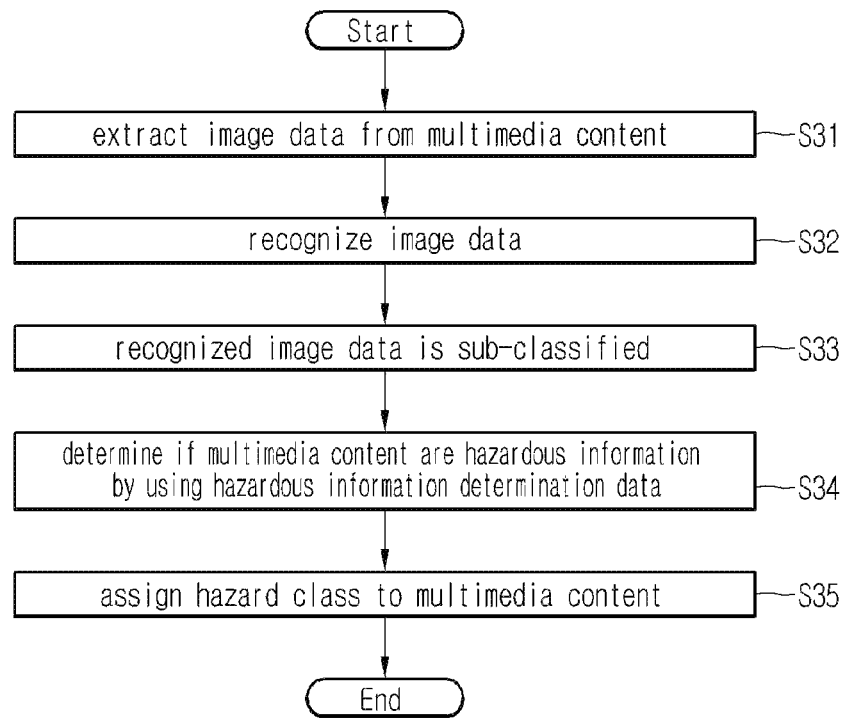
FIG. 3 is a flowchart illustrating a method for assigning an objectionable class of multimedia content according to an embodiment of the present invention.

Next, FIG. 3 is a flowchart illustrating a method for assigning an objectionable class to multimedia content according to an embodiment of the present disclosure. FIG. 2 will also be referred to in this description.

Referring to FIGS. 2 and 3, the transceiver 21 extracts image data from the received multimedia content (S31). When the multimedia content is a still picture, the corresponding still picture is used as the image data, and when the multimedia content is moving picture data, a certain frame (e.g., I frame) is used as the image data. Further, one or more frames can be extracted as the image data through the decoder 23 at a certain position.

The image data extracted through the decoder 23 is then processed by the Spam processor 24 (S32). Further, the Spam processor 24 recognizes the image of a human or a character from the background of the image data, and determines if the image data is objectionable information using the objectionable information determination data received from the server.

In addition, the objectionable information determination data includes the skin color distribution table of a human for determining lewd content, the location (vector value of the human body) and color information of a specific part, position information of a caption and the like. The Spam processor 24 determines if the pixels representing the skin color continuously appear in the image data using the skin color distribution table, and generates edges at regular intervals if there are discontinuous portions to recognize the shape of the human.

Further, the Spam processor 24 determines if characters or numerals having a predetermined color and size exist at certain positions, other than the predetermined position of the caption included in the objectionable information determination data. The image data recognized by the Spam processor 24 is then sub-classified (S33).

Figure 4:
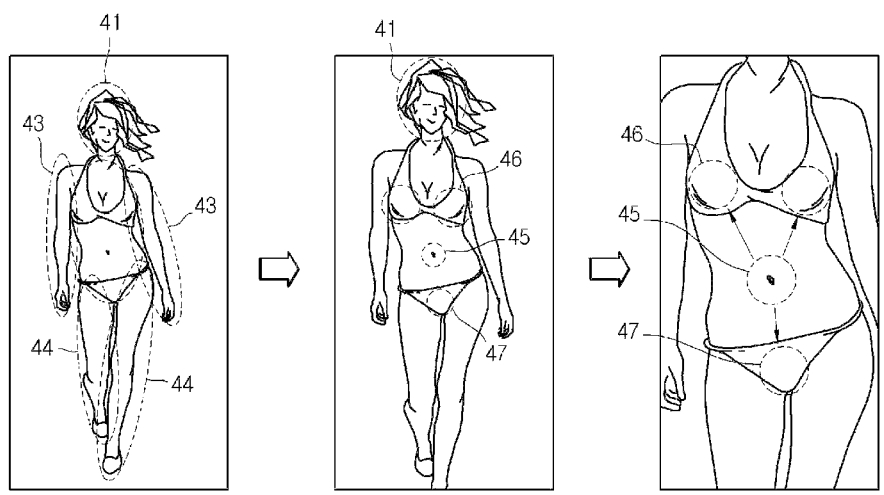
FIG. 4 is an overview showing a procedure for recognizing a human shape from image data according to an embodiment of the present disclosure.

For example, and as shown in FIG. 4, if the shape of a human is recognized, the shape of a human is sub-classified into a face 41, a body 42, arms 43 and legs 44. The face is recognized using well-known recognition methods. In addition, a human being includes 6 to 8 regions or divisions that use the face as a reference. Further, if the skin color distribution of a part near the face 41 has a thin and longish shape, the part is recognized as arms 43.

Similarly, if the skin color distribution of a part has a thick and short shape, the part is recognized as the body 42. Also, if the skin color distribution of a part remote from the face 41 has a thin and longish shape, the part is recognized as the legs 44.

As discussed above, in step S34, the Spam processor 24 determines if the multimedia content is objectionable information using the objectionable information determination data, and determines an objectionable class. For example, as shown in FIG. 4, the Spam processor 24 primarily determines the color of the parts recognized as the arms 43 and the legs 44. If the color does not coincide with that recorded in a skin color distribution table of the objectionable information determination data, the multimedia content is determined as non-objectionable information.

If the color of the parts recognized as the arms 43 and the legs 44 is determined as the skin color, the skin color of the part recognized as the body 42 is determined. Then, a part located at the central portion of the body 42 and having a circular shape with a predetermined size is recognized as the navel 45. Because the navel 45 is generally recessed, the navel 45 has a color different from the surrounding skin color due shading effects. Further, because the navel 45 has a circular boundary, the navel 45 can be easily recognized.

The Spam processor 24 also determines if the multimedia content is objectionable information by comparing the color of the breasts 46 and the pubic region 47, which are located at a predetermined position on the basis of the navel 45, with the objectionable information determination data. For example, the objectionable information determination data includes stored color information, which corresponds to the nipple of the breast and the pubic region, and the relative position of the breast and the pubic region with respect to the navel.

Accordingly, the objectionable information determination data can be compared with the color of the breast and the pubic region, thereby determining if the multimedia content is objectionable information and deciding an objectionable class. Further, the objectionable information determination data also includes a stored predetermine position at which the caption is displayed. Thus, if characters or numerals of the same color are recognized in the area out of the predetermine position, the multimedia content is determined as objectionable information.

In addition, the controller 27 then records the objectionable class in the header of the multimedia content determined as objectionable information (S35). For example, the controller 27 records the objectionable class, which exhibits lewd content or is an advertisement content according to objectionable information determination results, in the header, and then outputs a warning message exhibiting the objectionable class when the multimedia content is received or played.

Figure 5:
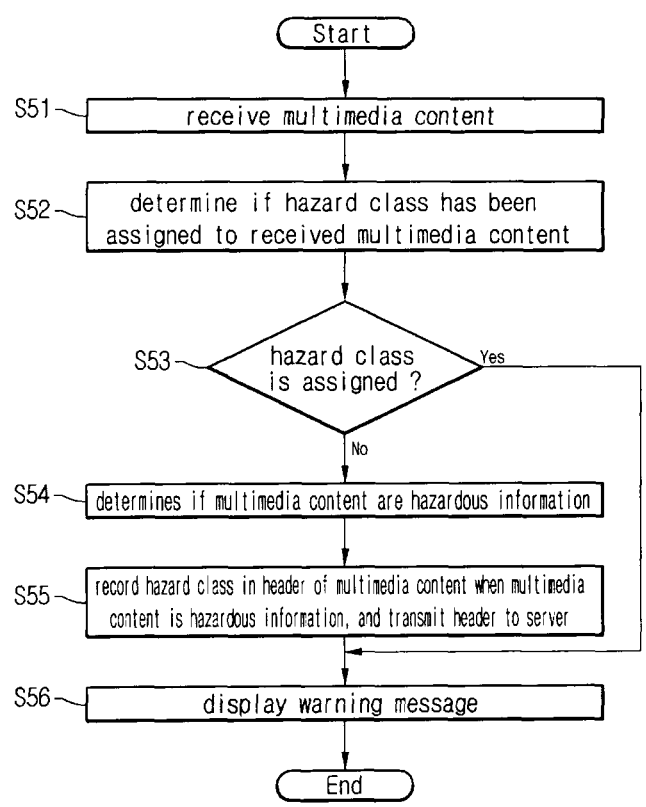
FIG. 5 is a flowchart illustrating a method for determining and blocking objectionable information according to an embodiment of the present invention.

Next, FIG. 5 is a flowchart of a method for determining and blocking objectionable information according to an embodiment of the present invention. FIG. 2 will also be referred to in this description.

Referring to FIGS. 2 and 5, the terminal accesses the server and receives selected multimedia content (S51), and analyzes the received multimedia content to determine if an objectionable class has been assigned to the multimedia content (S52). For example, the server 10 can transmit only the header of the multimedia content, and the terminal determines if the objectionable class has been recorded in the received header.

In more detail, the controller 27 controls the decoder 25 to analyze the header of the multimedia content received in the transceiver 21, thereby determining if the objectionable class has been recorded in the header. If the objectionable class has been recorded in the header (Yes in S53), the controller 27 displays a warning message corresponding to the objectionable class on a screen such that a user can recognize the warning objectionable class (S56).

For example, the controller 27 can display a warning message corresponding to the objectionable class on the screen such that a user can recognize the objectionable class indicating the content is lewd content or is an advertisement content. If the objectionable class has not been recorded in the header (No in S53), the server transmits the multimedia content and the controller 27 determines if the multimedia content is objectionable information (S54).

For example, the controller 27 extracts image data from the received multimedia content through the decoder 25, and recognizes the image data through the Spam processor 24, thereby determining if the multimedia content is objectionable information. The server can also extract image data from multimedia content requested by the terminal, and transmits the extracted image data. In such a case, the process in which the decoder 25 of the terminal extracts the image data can be omitted.

Further, if the terminal determines the received multimedia content is objectionable information, the controller 27 records an objectionable class in the header of the multimedia content, and then transmits the header to the server so the server can update the corresponding multimedia content (S55). In addition, the controller 27 displays a warning message corresponding to the objectionable class on the screen of the terminal such that a user can recognize the objectionable class (S56).

Further, the terminal can also again determine if the multimedia content is objectionable information even if the objectionable class has been recorded in the header of the multimedia content. That is, if the objectionable class recorded in the received header is different, the terminal adjusts the objectionable class, which has been recorded in the header, according to the priorities of the objectionable class, records the adjusted objectionable class in the header, and then transmits the header to the server so the server can update the multimedia content registered in the server.

In addition, the server compiles and stores lists of terminals accessing the server and multimedia content downloaded by the terminals into a database. Then, if the objectionable class of the multimedia content registered in the server is updated, the server transmits the header having the updated objectionable class to a terminal having previously downloaded the updated multimedia content when the terminal again accesses the server, so that the objectionable class of the multimedia content stored in the terminal can be updated.

Therefore, because a large amount of multimedia content is registered in the server, the terminal can determine objectionable information and transmit relevant information to the server even if the server does not determine the requested multimedia content includes objectionable information. Accordingly, an objectionable class can be assigned to multimedia content having no objectionable class, and the objectionable class of objectionable multimedia content can be adjusted. Further, the terminal can selectively receive and filter multimedia content based on the objectionable class.

In addition, when the objectionable class of the registered multimedia content is updated, the server transmits information including the updated objectionable class when a terminal having previously downloaded the multimedia content accesses the server. Accordingly, the objectionable class of the multimedia content is adjusted between the server and the terminal.

In addition, to reduce the transmission load on the terminals, the server advantageously can transmit only the header of the multimedia content, in which the header includes information about the multimedia content (e.g., an objectionable class, etc.). If the terminal decides the multimedia content is not objectionable, the terminal can request the server transmit the actual multimedia content. The terminal can then extract and review the received multimedia content to determine if the content is objectionable. Alternatively, the server can transmit both the header and multimedia content to the terminal at the same time.

Further, as shown in FIG. 1, both terminals 20 and 30 and the server 10 include a Spam processor. Thus, the server 10 can also perform Spam processing to determine if the multimedia content includes objectionable information and appropriately update the header of the content. Therefore, because the server 10 and terminals 20 and 30 can perform Spam processing, more objectionable content can be blocked.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for blocking objectionable information on a mobile communication terminal, the method comprising:

receiving objectionable information determination data from a server and storing the objectionable information determination data in the mobile communication terminal if a current version of the objectionable information determination data is not stored in the mobile communication terminal;

receiving objectionable information determining software from the server and installing the objectionable information determining software in the mobile communication terminal if the current version of the objectionable information determining software is not installed in the mobile communication terminal;

receiving header information corresponding to a particular multimedia content;

extracting grade information from the header;

determining if the extracted grade information is an allowable grade indicating that the particular multimedia content can be received by the mobile communication terminal;

receiving the particular multimedia content if the determining step determines the extracted grade information is the allowable grade or if the grade information is not recorded in the header;

comparing the received multimedia content using the objectionable information determining software with the objectionable information determination data stored in the mobile communication terminal to determine if the multimedia content is objectionable;

assigning an objectionable grade to the header of the multimedia content when the comparing step determines the received multimedia content is objectionable; and transmitting the header including the assigned objectionable grade including a priority of the assigned objectionable grade to the server that sent the particular multimedia contents so that the server adjusts the grade for the particular multimedia content, if the priority of the assigned objectionable grade is higher than a priority of a previously assigned objectionable grade.

2. The method of claim 1, further comprising:

outputting a warning message on the mobile communication terminal when the determining step determines the extracted grade information is not the allowable grade and when the comparing step determines the multimedia content is objectionable.

3. The method of claim 1, wherein the comparing step comprises:

extracting image data from the multimedia content;
determining if the extracted image data corresponds to a human shape; and
comparing the human shape with the objectionable information determination data stored in the mobile communication terminal,
wherein the assigning step assigns the objectionable grade to the header of the multimedia content when the comparing step determines the human shape is objectionable.

4. The method of claim 3, wherein the comparing step compares a skin color distribution of a human, location and color information of a specific body part of the human, and a position information of the human with the objectionable information determination data stored in the mobile communication terminal.

5. The method of claim 1, further comprising:

setting, on the mobile communication terminal, the allowable grade indicating that the particular multimedia content can be received by the mobile communication terminal.

6. The method of claim 5, wherein the allowable grade is changeable by a user of the mobile communication terminal.

7. A system for blocking objectionable information, the system comprising:

a server configured to store multimedia content, and provide current objectionable information determination data and current objectionable information determining software; and at least one mobile communication terminal configured to:
receive the objectionable information determination data from the server and store the objectionable information determination data if a current version of the objectionable information determination data is not stored in the mobile communication terminal, receive the objectionable information determining software from the server, and installing the objectionable information determining software in the mobile communication terminal if the current version of the objectionable information determining software is not installed in the mobile communication terminal, receive header information corresponding to a particular multimedia content, extract grade information from the header, determine if the extracted grade information is an allowable grade indicating that the particular multimedia content can be received by the mobile communication terminal, receive the particular multimedia content if the extracted grade information is determined to be the allowable grade or if the grade information is not recorded in the header, compare the received multimedia content using the objectionable information determining software with the objectionable information determination data stored in the mobile communication terminal to determine if the multimedia content is objectionable, assign an objectionable grade to the header of the multimedia content when the comparing step determines the received multimedia content is objectionable, and transmit the header including the assigned objectionable grade including a priority of the assigned objectionable grade to the server that sent the particular multimedia contents so that the server adjusts the grade for the particular multimedia content, if the priority of the assigned objectionable grade is higher than a priority of a previously assigned objectionable grade.

8. The system of claim 7, wherein the mobile terminal is further configured to output a warning message on the mobile communication terminal when the extracted grade information is determined not to be the allowable grade and when the multimedia content is determined to be objectionable.

9. The system of claim 7, wherein the mobile communication terminal is further configured to extract image data from the multimedia content, to determine if the extracted image data corresponds to a human shape, to compare the human shape with the objectionable information determination data stored in the mobile communication terminal, and to assign the objectionable grade to the header of the multimedia content when the human shape is determined to be objectionable.

10. The system of claim 9, wherein the mobile communication terminal is further configured to compare a skin color distribution of a human, location and color information of a specific body part of the human, and a position information of the human with the objectionable information determination data stored in the mobile communication terminal.

11. The system of claim 7, wherein the mobile communication terminal is further configured to set the allowable grade indicating that the particular multimedia content can be received by the mobile communication terminal.

12. The system of claim 11, wherein the allowable grade is changeable by a user of the mobile communication terminal.

13. The system of claim 7, wherein the at least one mobile communication terminal and the server each include a Spam processor.

14. A mobile communication terminal, comprising:

a receiving unit configured to receive objectionable information determination data from a server and store the objectionable information determination data if a current version of the objectionable information determination data is not stored in the mobile communication terminal, to receive objectionable information determining software from the server if the current version of the objectionable information determining software is not installed in the mobile communication terminal, and to receive header information corresponding to a particular multimedia content;

an extracting unit configured to extract grade information from the header;

a determining unit configured to determine if the extracted grade information is an allowable grade indicating that the particular multimedia content can be received by the mobile communication terminal, said receiving unit further configured to receive the particular multimedia content if the determining step determines the extracted grade information is the allowable grade or if the grade information is not recorded in the header;

a comparing unit configured to compare the received multimedia content using the objectionable information determining software with the objectionable information determination data stored in the mobile communication terminal to determine if the multimedia content is objectionable;

an assigning unit configured to assign an objectionable grade to the header of the multimedia content when the comparing unit determines the received multimedia content is objectionable; and a transmitting unit configured to transmit the header including the assigned objectionable grade and a priority of the assigned objectionable grade to the server that sent the particular multimedia contents so that the server adjusts the grade for the particular multimedia content, if the priority of the assigned objectionable grade is higher than a priority of previously assigned objectionable grade.

15. The mobile communication terminal of claim 14, further comprising:

an outputting unit configured to output a warning message on the mobile communication terminal when the determining unit determines the extracted grade information is not the allowable grade and when the comparing unit determines the multimedia content is objectionable.

16. The mobile communication terminal of claim 14, wherein the comparing unit is further configured to extract image data from the multimedia content, to determining if the extracted image data corresponds to a human shape, and to compare the human shape with the objectionable information determination data stored in the mobile communication terminal, and wherein the assigning unit assigns the objectionable grade to the header of the multimedia content when the comparing unit determines the human shape is objectionable.

17. The mobile communication terminal of claim 16, wherein the comparing unit compares a skin color distribution of a human, location and color information of a specific body part of the human, and a position information of the human with the objectionable information determination data stored in the mobile communication terminal.

18. The mobile communication terminal of claim 14, further comprising:

a setting unit configured to set the allowable grade indicating that the mobile communication terminal can receive the particular multimedia content.

19. The mobile communication terminal of claim 18, wherein the allowable grade is changeable by a user of the mobile communication terminal.

20. The method of claim 1, wherein the assigned objectionable grade transmitted in the header is different from a corresponding objectionable grade stored in the server for the multimedia content such that the server updates the corresponding objectionable grade stored in the server with the newly assigned objectionable grade transmitted in the header.

21. The method of claim 1, wherein the transmitting step transmits the header including the assigned objectionable grade to another mobile communication terminal that sent the particular multimedia contents via the server so that the another mobile communication terminal adjusts the grade for the particular multimedia content.

22. The system of claim 7, wherein the assigned objectionable grade transmitted in the header is different from a corresponding objectionable grade stored in the server for the multimedia content such that the server updates the corresponding objectionable grade stored in the server with the newly assigned objectionable grade transmitted in the header.

23. The system of claim 7, wherein the mobile communication terminal transmits the header including the assigned objectionable grade to another mobile communication terminal that sent the particular multimedia contents via the server so that the another mobile communication terminal adjusts the grade for the particular multimedia content.

24. The mobile communication terminal of claim 14, wherein the assigned objectionable grade transmitted in the header is different from a corresponding objectionable grade stored in the server for the multimedia content such that the server updates the corresponding objectionable grade stored in the server with the newly assigned objectionable grade transmitted in the header.

25. The mobile communication terminal of claim 14, wherein the transmitting unit is further configured to transmit the header including the assigned objectionable grade to another mobile communication terminal that sent the particular multimedia contents so that the another mobile communication terminal adjusts the grade for the particular multimedia content.

* * * * *